May 8, 1962 S. LA MANNA 3,033,323
FLUID CHECKING DEVICE AND CONTROL VALVE THEREFOR
Filed June 16, 1959
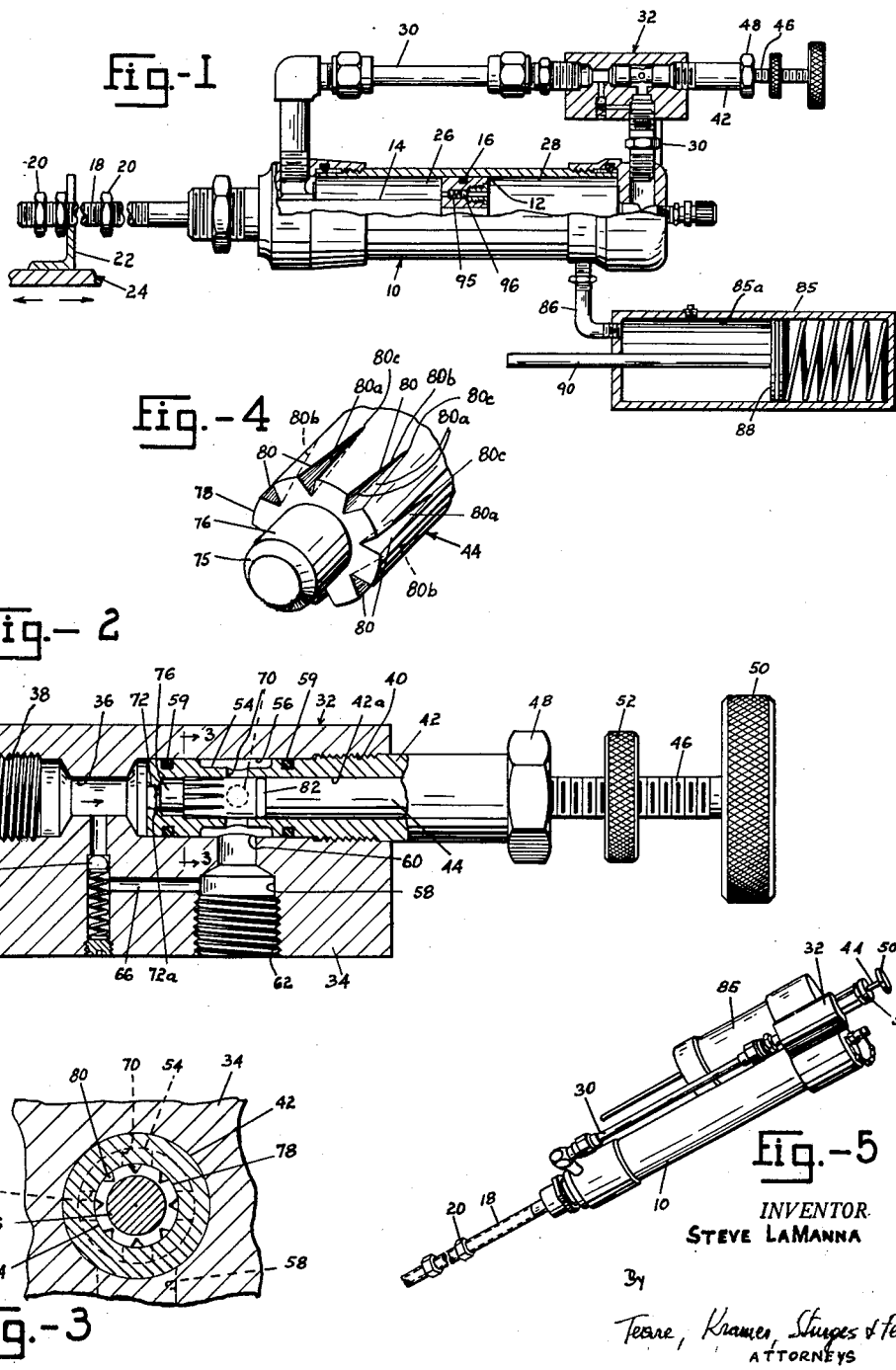
INVENTOR
STEVE LaMANNA United States Patent Office 3,033,323
Patented May 8, 1962

3,033,323
FLUID CHECKING DEVICE AND CONTROL
VALVE THEREFOR
Steve La Manna, 7546 W. 111th St., Parma 30, Ohio
Filed June 16, 1959, Ser. No. 820,740
8 Claims. (Cl. 188—97)

This invention relates in general to fluid checking or braking devices and a control valve therefor, and more particularly to a reciprocable type of fluid checking device and an adjustable metering valve for precisely and selectively controlling the flow or displacement of fluid through the checking device.

Fluid checking or braking devices with which the present invention is concerned are adapted for a variety of uses, such as the control of power operated machinery and the like, and are particularly useful for precisely and selectively controlling the movement of a powered, movable component of the machine, such as the feed member on a metal or woodworking machine, with respect to a stationary or non-moving portion of the machine. The checking or braking device of the present invention may be in the form of a fluid-containing piston and cylinder unit attached to a non-moving portion of the aforementioned machine with the piston rod of the checking device coacting with the movable or feed member of the machine in braking relationship, to control the movement thereof by yieldably resisting the movement of such feed member. A manually adjustable, exteriorly accessible valve member is disposed in the circuit or path of travel of the fluid through the braking device, to precisely control the flow or displacement of such fluid, and thereby selectively control the movement of the movable member of the aforementioned machine.

Accordingly, an object of the invention is to provide a fluid checking or braking device which may be readily and selectively manipulated to adjustably and precisely control the fluid flow therethrough.

Another object of the invention in to provide a device of the latter mentioned type in a comparatively compact unit, which may be readily mounted on a power driven machine to precisely and selectively control the movement of a movable or feed member of the machine with respect to a stationary part of the machine.

Another object of the invention is to provide a device of the above mentioned type including a novel adjustable metering valve for more precise control of the fluid displacement or flow through the braking or checking device, as compared to known arrangements for accomplishing a similar result.

A more specific object of the invention is to provide a control valve of the latter mentioned type having a plurality of tapered V-shaped, vanishing slots disposed around the periphery of the metering pin of the valve for passing fluid in a manner to precisely and uniformly control the flow thereof through the valve structure.

A still further object of the invention is to provide a checking device including a control valve which is relatively simply and compactly constructed, is efficient to operate, and comparatively inexpensive to manufacture.

Other features and advantages of the invention will be apparent from a consideration of the following description taken in conjunction with the accompanying drawings and wherein:

FIG. 1 is a side elevational, partially sectioned view of a braking or checking mechanism in accordance with the instant invention, with the structure in certain instances being shown more or less diagrammatically in the interest of clarity.

FIG. 2 is an enlarged vertical sectional view of the control valve of the mechanism shown in FIG. 1.

FIG. 3 is an enlarged, vertical sectional view taken substantially along line 3—3 of FIG. 2, looking in the direction of the arrows.

FIG. 4 is a fragmentary, enlarged perspective view of the inner end of the metering pin member of the control valve of FIG. 2, and in particular illustrates the structural arrangement of the fluid passing slots in such end portion.

FIG. 5 is a perspective view of the overall appearance of a preferred embodiment of the invention to illustrate the compact structure of the mechanism, it being understood as aforesaid that FIG. 1, which comprises the same components of mechanism as FIG. 5, has been shown in certain instances in a more or less diagrammatic manner for illustrative purposes and clarity of structure.

Referring now again to the drawings, the checking mechanism comprises a cylinder member 10 having a piston 12 disposed therein. A piston rod 14 is secured at one end to the piston 12 and at the other end projects exteriorly of the closed cylinder 10. An O-ring 16 of conventional type is mounted in a circumferentially extending groove in piston 12 and coacts with the interior surface of the cylinder 10 in fluid sealing relation. The other end of the piston rod 14, in the embodiment illustrated, is threaded as at 18, and a plurality of nut elements 20 are provided for securing the rod, in a lengthwise direction, to bracket 22 of movable member 24 of a machine. As shown by the full line arrows of FIG. 1, member 24 is movable in either longitudinal direction.

Piston 12 divides the interior of cylinder 10 into front and rear expansible chambers 26 and 28 respectively. An external duct or passage 30 comprised, in the embodiment illustrated, of pipe elements, connects front chamber 26 with rear chamber 28. Disposed in duct or passageway 30 is an adjustable control valve 32 for precisely and selectively controlling the flow of resistance fluid from the front chamber 26 through duct 30 to the rear chamber 28 during outward movement of the piston rod 14 and associated movable member 24 of the machine.

Valve 32 comprises a body or block portion 34 (FIG. 2) with a passageway 36 extending longitudinally completely therethrough. Passageway 36 is threaded at one end as at 38 for connection to the pipe elements of duct 30, and is also threaded at the other end as at 40 for receiving in threaded holding engagement a metering pin housing member 42.

Member 42 has an axially extending passageway 42a extending completely therethrough for receiving therein in complementary, rotatable mounted relation a metering pin member 44. The outer portion of metering pin member 44 is threaded as at 46 and coacts with a complementary, internally threaded collar portion 48 secured to the outer end of housing member 42 for adjusting the axial position of metering pin member 44 in housing 42. A wheel portion 50 secured to the outer end of pin 44 is provided for so adjusting the axial position of pin 44, and a locking element 50 threadedly mounted on threaded portion 46 of element 44 is provided for removably locking member 44 in place.

Housing member 42 is provided with a circumferentially extending groove 54 (FIG. 2) intermediate its ends which coacts with complementary confronting surfaces 56 of passageway 36 in body portion 34, for providing a fluid passing path to passageway 58 which extends generally transversely to passage 36 and communicates with the latter as at 60, and at the other end with the exterior of the body member 34. Passageway 58 is threaded, as at 62, for connection to further pipe components of duct 30 and thence to the rear chamber 28 of cylinder 10. O-ring elements 59 of conventional type are disposed in complementary, circumferentially extending grooves on either side of passageway 54 for sealing the latter against the loss of fluid. A spring loaded adjustable relief valve 64 is provided together with an auxiliary passageway 66 for by-passing the control valve mechanism in the event of complete closure or obstruction thereof.

Generally radially extending openings 70 in the defining wall of housing element 42 connect the axially passageway 42a in housing 42 with the circumferentially extending, exterior groove 54 therein. The inner end of passageway 42a is constricted as at 72 to provide a seat portion which is adapted for engagement with the inner end of metering pin member 44. Such seat portion restricts the inward axial movement or displacement of pin member 44 with respect to the body of block member 34, and is tapered, as at 72a, for engagement with complementary tapered end surface 75 (FIG. 4) of pin 44.

The inner end portion 76 of pin 44 is of reduced diameter which provides a shoulder portion 78 on the pin (FIGS. 3 and 4). The space between reduced diameter portion 76 and the confronting interior wall surfaces of passageway 42a of housing 42 provides a fluid passing passageway as will be hereinafter discussed in greater detail. Disposed around the periphery of shouldered portion 78 of the pin 44 are a plurality of longitudinally extending, V-shaped, fluid passing grooves or slots 80. The defining side walls 80a of each of the slots converge with respect to one another and in a direction away from the shoulder portion 78 of the pin while the inner juncture line 80b of the side walls 80a slopes upwardly toward the exterior surface of the pin, in a direction away from the shouldered portion 78, to meet at apex 80c on the periphery of the pin, to thereby provide a vanishing or graduated slot arrangement. As can be readily seen from FIG. 2 of the drawings, when the pin 44 is in its forward-most position with respect to housing 42 with the reduced diameter end portion 76 of the pin abutting the constricted portion 72 of passageway 42a in housing 42, such apex points are spaced slightly inwardly of radial openings 70 in housing 42, and thus substantially no fluid can pass from passageway 36 through slots 80 to openings 70.

A conventional O-ring 82, disposed in a complementary groove located outwardly of openings 70, is provided for fluid sealing relation between the pin 44 and the defining interior walls of passageway 42a in housing 42.

A reservoir cylinder 85 is provided communicating with rearward chamber 28 of checking cylinder 10, as by means of duct 86. Fluid chamber 85a of reservoir cylinder 85 is filled with a supply of resistance fluid, and is provided with a spring loaded plunger or piston 88 and associated piston rod 90 extending exteriorly of the cylinder 85. Rod 90 indicates when the reservoir needs replenishing, due to loss of resistance fluid in the system.

Operation of the mechanism may be as follows: The cylinder 10 of the checking device is attached to a nonmoving member of a machine as aforediscussed. The threaded end of piston rod 14 of the checking device is then attached to the bracket 22 on the moving or feed member 24 of the machine as by means of the nuts 20. A spacing may be left between the nuts on either side of the bracket 22 to provide for some rapid or free lengthwise movement of the movable member 24 with respesct to the abutment nuts, or the nuts can be positioned tightly against the sides of the bracket to prevent any free movement between the bracket and the retaining nuts. The checking unit will control the action of movement of movable portion 24 upon contact of bracket 22 with the outer or forward nut and as shown in FIG. 1 of the drawings. This piston 12 and associated piston rod 14 will be advanced against the resistance to compression of the resistance fluid in forward chamber 26 of cylinder 10, with the fluid being forced through duct 30 into passageway 36 in block 34 of valve member 32, through constricted portion 72 of passageway 42a in housing member 42, through the slots 80 in pin 44 from which it passes through coacting openings 70 into groove 54 in the exterior periphery of housing 42, and thence through passageway 58 to rearward chamber 28 in checking cylinder 10. Manipulation of wheel 50 and associated threaded rotation of pin 44 with respect to threaded collar 48 to thus displace the pin 44 in an axial direction will adjust the amount of coaction between the vanishing slots 80 and the radial openings 70, and thus selectively permit a greater or lesser flow of resistance fluid through valve 32 and thereby decrease or increase the resistance to movement of feed or movable member 24 of the machine. The slotted arrangement of the inner end of metering pin 44, and the tapered configuration of such slotted arrangement for coaction with the radial openings 70 in housing member 42 provides a mechanism which will precisely and uniformly control the flow of resistance fluid in the closed circuit of the checking device. The relative change of flow rate of resistance fluid through the valve is generally uniform throughout the range of adjustment of the valve thereby providing a braking device and associated control valve which furnishes smooth and precise braking or checking characteristics. It will be apparent, of course, that the farther pin 44 is threaded or displaced outwardly of housing 42, the more fluid flow occurs through slots 80 and coacting passages 70, thus reducing the checking action of the device. The fluid passing slots 80 in pin 44 are preferably so arranged about the periphery thereof and the diameter or width of openings 70 in housing member 42 are so adjusted that substantially only one complete or full volume of slot cross-section can coact in fluid passing relation with an associated opening 70 at one time irrespective of the rotary movement of the pin 44, during axial displacement or adjustment thereof. In other words, as one slot begins to pass out of the peripheral range of an associated opening, another of the slots 80 begins to move into coacting relation with said opening, thereby providing more uniform and smooth flow rate change through the valve 32 during rotational movement of pin 44 to adjust the axial position thereof, the latter producing variation of the fluid flow through the valve and from the checking cylinder.

Upon movement of the movable member 24 in the opposite direction or toward the right-hand side (as viewed in FIG. 1) of the drawings, the bracket 22 engages the inner nut 20 and thus moves the piston 12 and associated piston rod 14 inwardly into the cylinder 10 of the checking device. A passageway 95 is provided through piston 12 as shown in FIG. 1 with a one way spring loaded check valve 96 for permitting the generally free movement of the resistance fluid through the piston on the return stroke of the piston rod 14. The checking unit is extremely compact as can be readily seen from FIG. 5 of the drawings thus facilitating the mounting thereof on an associated machine. The component parts of the mechanism and especially the valve mechanism 32 are readily replaceable, thus obviating the necessity of replacing the entire unit in the event of wear.

From the foregoing description and accompanying drawings it will be seen that the invention provides an improved braking or checking device which may be selectively and readily adjusted by means of a novel control valve for precisely and uniformly controlling the flow of resistance fluid through the device. It will also be seen that the invention provides a control valve mechanism particularly well adapted for use in the latter mentioned arrangement which includes V-shaped fluid passing slots therein for adjustable coaction with radially extending openings in an encircling housing member of the valve, for regulating in an improved manner the flow of resistance fluid through the valve.

The terms and expressions which have been employed are used as terms of description and not of limitation and there is no intention in the use of such terms and expressions of excluding any equivalents of any of the features described or shown or portions thereof, but it is recognized that various modifications are possible within the scope of the invention claimed.

I claim:

1. In a compact fluid checking device for power machinery comprising, a cylinder, piston means operable in the cylinder and having a piston rod extending exteriorly of an end of the cylinder, said piston means dividing the interior of said cylinder into a front expansible chamber and a rear expansible chamber, said chambers being adapted to receive resistance fluid therein for resisting axial movement of said piston means, the combination therewith of a detachable fluid transmitting duct disposed completely exteriorly of said cylinder and connecting the front expansible chamber with the rear expansible chamber, a control valve disposed in said duct for selectively adjusting the flow of fluid therethrough upon axial movement of said piston means, and means detachably connecting said valve in said exterior duct for ready removal of said valve from said duct, said valve comprising a rotatable and axially movable fluid metering pin member, said pin member adjacent one end thereof comprising a plurality of peripheral, lengthwise extending fluid passing slots therein, said slots being divergently tapered in a direction lengthwise thereof toward said one end of said pin member for adjusting the flow of fluid therethrough in response to axial movement of said pin member, a plurality of circumferentially spaced fluid passing apertures in the valve, said apertures being adapted for communicating coaction with said slots for controlling the flow of fluid through the valve, said apertures being so disposed with respect to said slots that a predetermined cross sectional area of said slots coacts with said apertures irrespective of the rotational position of said pin member with respect to said apertures, when fluid passing coaction occurs between said slots and apertures, thereby providing for smooth and uniform axial movement of said piston means in said cylinder.

2. In a compact fluid checking device for power machinery comprising a cylinder, piston means operable in said cylinder and having a piston rod extending exteriorly of an end of said cylinder, the exterior portion of said rod including means for attaching said rod to an associated powered object, said piston means dividing the interior of said cylinder into a front expansible chamber and a rear expansible chamber, said chambers being adapted for receiving therein resistance liquid for resisting axial movement of said piston means, a check valve located in said piston means to provide substantially free flow of resistance liquid from the rear expansible chamber to the front expansible chamber, to thereby provide a quick return stroke for said device, a reservoir housing having a chamber communicating with the cylinder and adapted to contain a supply of resistance liquid, a spring biased piston disposed in said reservoir housing, means secured to the last mentioned piston extending exteriorly of the reservoir housing to give a visual indication of the quantity of resistance liquid in said device, the combination therewith of a liquid passing duct extending completely exteriorly of said cylinder in generally justaposed and detachable relation thereto and connecting the front expansible chamber to the rear expansible chamber, a manually manipulatable control valve including a valve housing disposed in said duct for selectively adjusting the flow of liquid therethrough upon axial movement of said piston means in a direction toward the front expansible chamber, and means detachably connecting said valve housing in said duct for ready removal of said valve from said duct, said valve comprising a rotatable and axially movable liquid metering pin member extending exteriorly of the valve housing, means adjacent the exterior end of said pin member for rotating the latter, said pin member adjacent the inner end thereof comprising a plurality of peripheral, circumferentially and uniformly spaced, lengthwise extending liquid passing slots therein, said slots being divergently tapered in a direction lengthwise thereof toward said inner end of said pin member, for adjusting the flow of liquid therethrough in response to axial movement of said pin member, a plurality of circumferentially and uniformly spaced radially extending liquid passing apertures disposed in said valve and adapted for communicating coaction with said slots to pass resistance liquid through said valve from the ingress port thereof to the egress port thereof, said apertures being so arranged with respect to said slots that a predetermined cross sectional area of said slots coacts with said radial apertures in said valve irrespective of the rotational position of said pin member with respect to the valve housing, when liquid passing coaction occurs between the slots and the apertures, thereby providing for smooth and uniform axial movement of said piston means in said cylinder.

3. A control valve for a fluid checking device for use in power machinery comprising, a body portion having a passageway therethrough for ingress and egress of resistance fluid, a metering pin disposed in said passageway and coacting with the same for adjusting the flow of resistance fluid therethrough, means for moving said pin axially in the passageway upon rotation of said pin, said pin comprising a plurality of lengthwise extending, circumferentially and uniformly spaced fluid passing slots disposed on the periphery of said pin, said slots being divergently tapered lengthwise of said pin toward an end thereof, a plurality of circumferentially and uniformly spaced fluid passing apertures in said valve body portion adapted for fluid passing coaction with said slots for passing resistance fluid through said valve, said apertures being so arranged with respect to said slots that a predetermined cross sectional area of said slots coacts with said apertures irrespective of the rotational position of said pin with respect to said body portion, when fluid passing coaction occurs between said slots and said apertures, thereby providing for the smooth and uniform control of the flow of resistance of fluid through said valve.

4. A control valve for a fluid checking device for use in power machinery comprising a body portion having an opening therethrough for ingress and egress of fluid, an open ended hollow housing member disposed in said opening, said member having a circumferentially extending groove in the exterior surface thereof, said groove in conjunction with the confronting surface of said opening defining a fluid transmitting passageway communicating with the egress portion of said opening, said member having circumferentially and uniformly spaced radial apertures through the wall thereof communicating said groove with the interior of said member, a metering pin disposed in generally surface-to-surface relation in said housing member, exteriorly accessible means for moving said pin axially in said housing member upon rotation of said pin, said pin comprising circumferentially and uniformly spaced, lengthwise extending V-shaped slots in the periphery thereof adjacent one end thereof, said slots being adapted to connect at one end with the ingress portion of said opening and at the other end with said apertures and to coact therewith for transmitting resistance fluid therethrough, said slots being divergently graduated in a lengthwise direction toward said one end, said apertures being so arranged with respect to said slots so that a predetermined cross sectional area of said slots coacts with said apertures irrespective of the rotational position of said pin with respect to said housing member, when fluid passing coaction occurs between said slots and said apertures, whereby the fluid flow will be progressively and smoothly changed upon axial movement of said pin.

5. In a fluid control valve in accordance with claim 4, wherein said pin member has means disposed in threaded coaction with said housing member for causing said axial displacement thereof.

6. A fluid control valve in accordance with claim 4 wherein said housing member comprising a constricted portion on the inner end thereof, the confronting end of said pin member being adapted for engagement with said constricted portion to limit said axial displacement of said pin member in one direction.

7. In a fluid control valve in accordance with claim 6, wherein said slots are disposed intermediate said confronting end of said pin member and said radial apertures in said housing member when said pin member is in its maximum inwardly displaced position, said slots being disposed out of coacting relationship with said radial apertures when said pin member is in said last mentioned position.

8. A fluid control valve in accordance with claim 7, wherein said body portion comprises an auxiliary fluid passageway by-passing said pin member, said auxiliary passageway being normally closed by a relief valve but being openable upon application of a predetermined fluid pressure to said relief valve.

References Cited in the file of this patent
UNITED STATES PATENTS

| | | |
|---|---|---|
| 1,880,234 | Bullock et al. | Oct. 4, 1932 |
| 1,944,689 | Heverly | Jan. 23, 1934 |
| 1,945,499 | Flarsheim | Jan. 30, 1934 |
| 2,133,527 | Beckman | Oct. 18, 1938 |
| 2,485,953 | Barth | Oct. 25, 1949 |
| 2,488,992 | Taylor | Nov. 22, 1949 |
| 2,790,991 | Schlage | May 7, 1957 |